United States Patent [19]

Miss et al.

[11] Patent Number: 4,914,186

[45] Date of Patent: Apr. 3, 1990

[54] METHOD FOR THE CONTINUOUS RECOVERY OF ORGANIC POLYMERS FROM SOLUTIONS OR EMULSIONS THEREOF

[75] Inventors: Helmut Miss, Hilden; Dieter Oppelt, Burscheid; Diez Heine, Leverkusen; Reinhard Sipos, Dormagen, all of Fed. Rep. of Germany

[73] Assignee: Bayer Aktiengesellschaft, Leverkusen, Fed. Rep. of Germany

[21] Appl. No.: 180,411

[22] Filed: Apr. 12, 1988

[30] Foreign Application Priority Data

Apr. 15, 1987 [DE]  Fed. Rep. of Germany ....... 3712798

[51] Int. Cl.⁴ .............................. C08F 6/12; C08F 6/20
[52] U.S. Cl. .................................... 528/500; 528/499; 528/503; 264/12
[58] Field of Search ........................ 528/499, 500, 503; 523/315; 264/12

[56] References Cited

U.S. PATENT DOCUMENTS

| | | | |
|---|---|---|---|
| 2,366,460 | 1/1945 | Semon | 528/499 X |
| 2,959,561 | 11/1960 | Kelley | 523/315 |
| 3,234,995 | 2/1966 | Van den Berg et al. | 528/499 X |
| 3,320,220 | 5/1967 | Di Drusco et al. | 528/499 |
| 3,553,186 | 1/1971 | Schnoring et al. | 528/500 |
| 4,303,569 | 12/1981 | Güurak et al. | 523/315 X |

*Primary Examiner*—Joseph L. Schofer
*Assistant Examiner*—F. M. Teskin
*Attorney, Agent, or Firm*—Sprung Horn Kramer & Woods

[57] ABSTRACT

In order to achieve good results during the continuous recovery of organic polymers from solutions or emulsions thereof, even if there are irregularities due to variations in operation, and to ensure a minimum residual content of solvent in the polymer, a two-component nozzle is used, from whose inner duct the solution or emulsion is injected at an angle $\beta$ to the nozzle axis and from whose outer duct a vapor jet issues at an angle $\alpha$ which is between 1° and 90° greater than the angle $\beta$, the vapor jet breaking the jet of solution or emulsion into many small particles and wherein injection takes place in a vessel which is filled with a liquid which is immiscible with the solution or emulsion, in particular water.

3 Claims, 1 Drawing Sheet

METHOD FOR THE CONTINUOUS RECOVERY OF ORGANIC POLYMERS FROM SOLUTIONS OR EMULSIONS THEREOF

BACKGROUND OF THE INVENTION

The invention relates to a method and an apparatus for the continuous recovery of organic polymers from their solutions or emulsions, wherein such a solution or emulsion is injected into a liquid which is immiscible with the solution or emulsion, is heated above the boiling point of the respective azeotrope and is located in a vessel and wherein a vapour stream is supplied concentrically to the stream of solution or emulsion.

It is generally known that solutions of polymers in organic solvents can be worked up by introducing such solutions into a hot liquid, preferably into an aqueous liquid, the temperature of which lies above the boiling point of the organic water azeotrope and in which the polymer does not dissolve. The organic solvent distills over and the polymer is precipitated. It can then be separated, for example by filtration. This method fails with all polymers which have tacky properties in solution or in the solid state.

A method for obtaining polymonoolefins, polydiolefins or olefinic mixed polymers from their solutions in hydrocarbon is known (DE-AS No. 1 179 375 corresponding to FR-PS No. 1 302 028) in which these solutions are introduced in filament form by means of cooled nozzles into the base of a column filled with water at above 80° C. and the fine polymers which have risen to the surface of the water and are divided into small pieces are separated, the method only operating if the diameter of the filament or of the nozzle, the working temperature, the consistency of the solution and the discharge rate of the filament from the nozzle are maintained exactly during operation of the apparatus. As this has proven difficult, disturbances can easily occur during operation.

In particular, lumps of solid polymer are easily formed during an interruption or decline in the quantity of solution supplied.

In addition, a method for the continuous recovery of organic polymers from their solutions or stable dispersions in organic solvents is described in DE-PS No. 1 570 094 (corresponding to U.S. Pat. Ser. No. 3,553,186) which is characterised in that such solutions or dispersions containing a liquid which is immiscible with them are converted into an unstable coarse dispersion in which the immiscible liquid is the continuous phase, this dispersion is introduced through a nozzle into the base of a container which contains a liquid which is also immiscible with the polymer solution or dispersion, the temperature of which is higher than the boiling temperature of the organic solvent, wherein the flow rate of the dispersion from the nozzle into the heated immiscible liquid and the vaporisation rate of the organic solvent are controlled by a vapour stream guided annularly around the nozzle.

This method does not ensure optimum precipitation, particularly in the case of tacky polymers, and the residual solvent content in the polymer is still too high.

SUMMARY OF THE INVENTION

The object is to find a method and an apparatus for the continuous recovery of organic polymers from the solutions and emulsions thereof, which are less sensitive to variations in operation and in which a lower residual solvent content in the polymer is ensured.

This object is achieved in that the solution or emulsion is injected in in the form of a hollow jet and that the vapour jet is injected at an angle $\alpha$ which, between 1° and 90°, is greater than the angle $\beta$ between the jet of solution or emulsion and the nozzle axis.

This enables the vapour jet to disperse the jet of solution or emulsion enclosed by it as it leaves the nozzle. The hollow configuration of this jet assists its dispersion into minute particles, producing a maximum surface area which promotes optimum evaporation of the solvent. It has been found that, owing to the particular method of atomisation, variations in the operating parameters such as working temperature, throughput, consistency of the solvent, viscosity variations of the solution or emulsion, insofar as they remain in the conventional range, hardly effect the quality of the polymer. In particular, owing to the fine dispersion of the jet of solution or emulsion, the risk of conglutination of the precipitated polymer is reduced. The speed of the vapour jet in the outlet cross-section can preferably be adjusted manually to the speed of sound or ultrasound. Good results are achieved if the angle $\alpha$ is selected in the range of from 10° to 45° and the angle $\beta$ in the range of from 5° to 15°.

The new method can basically be used for separating all polymers from organic solvents, wherein the polymers can be dissolved or emulsified in these solvents.

Suitable polymers include polydiolefins or mixed polymers thereof such as polybutadiene, polybutadiene-styrene, polyisoprene and the rubber component of acrylonitrile butadiene-styrene polymers. Furthermore, polymonoolefins or the mixed polymers thereof such as butyl rubber and also perchlorinated polymers composed, for example, of polyethylene, polypropylene, ethylene propylene copolymers, polyisobutylene, polyisoprene, polybutadiene and butadiene dichloroethane copolymers.

Solvents for these polymers and copolymers include aliphatic and aromatic hydrocarbons as well as halogen derivatives thereof, for example hexane, heptane, benzene, toluene, carbon tetrachloride, chloroform, trichlorethylene, tetrachlorethylene, tetrachloroethane, chlorobenzene and dichlorobenzene.

This method of atomisation is particularly suitable for isolating chlorinated rubber from its solution or emulsions in organic solvents, in particular in carbon tetrachloride or toluene. For example, the chlorinated rubber can be emulsified in a solution in carbon tetrachloride or toluene in water.

A 5 to 40% solution or emulsion of chlorinated rubber in toluene with water is particularly suitable. The wall thickness of the atomised hollow jet should preferably be between 0.1 and 5 mm because particularly good dispersion of the jet by the vapour jet is ensured in this range. The solvent is vaporised to a residual content of only about 1 to 5% by weight. The chlorine rubber solution or emulsion should be at a temperature of from 20° to 85° C. during atomisation. Steam and polymer solution or emulsion are supplied in a mass ratio of from 1:3 to 5:1. Water at a temperature of from 70° to 120° C. is generally used as liquid for precipitation, and the corresponding chamber can be at atmospheric pressure or excess pressure. It goes without saying that the solution must be supplied at such a preliminary pressure that the solvent does not evaporate prematurely.

The hollow jet of solution or emulsion is preferably sprayed in with a wall thickness of from 0.1 to 5 mm.

The choice of wall thickness depends on the respective viscosity of the solution or emulsion, the working pressure prevailing and the desired properties of the product.

According to a particular embodiment of the method, the discharge rate of the hollow jet of solution or emulsion is adjusted while keeping the preliminary pressure contact.

Variations in the operating parameters can be compensated for by varying the discharge rate, in particular by varying the wall thickness of the jet of solution or emulsion so that optimum results can be achieved even with solutions or emulsions which are difficult to process.

The new apparatus for the continuous recovery of organic polymers from their solutions or emulsions is based on a vessel for a liquid into which there projects a multicomponent nozzle comprising a central duct for the solution or emulsion and a concentric duct for vapour.

The novelty resides in a two-component nozzle, the two ducts of which are separated from one another by a tube and in whose inner duct a moveable nozzle needle is arranged centrally, the orifice of the inner duct being constructed as a control section and enclosing an angle $\beta$ with the nozzle axis while the orifice of the outer duct forms, with the nozzle axis, an angle $\alpha$ which is between 1° and 90° greater than the angle $\beta$.

The new method can also basically be carried out with suitable two-component nozzles of different structure, but under less than optimum conditions.

The design of the orifice of the inner duct—or more precisely the region behind the actual orifice—as control section is desirable not only for using the apparatus for atomising a variety of solutions or emulsions, but variations in operation can also be compensated during operating by means of this control section. Conglutination of the precipitated polymer can be avoided owing to the good adjustability of the wall thickness of the hollow jet of solution or emulsion.

In a particularly desirable design of the control section, said section is designed to taper conically in the atomisation direction in that, in this region, the internal wall of the tube and the tip of the nozzle needle have conical surfaces which preferably run at the same angle to the nozzle axis.

The new apparatus is preferably characterised by a sealing fit between nozzle needle and tube.

In this way, injection of the solution or emulsion can be interrupted, if necessary, and penetration of the liquid located in the container into the internal duct can be prevented during interruptions in operation.

In a particularly advantageous manner, the control section is at the same time designed as a sealing fit. This is particularly advantageous if the conical limiting faces run at the same angle to the nozzle axis. In fact, the limiting surfaces themselves form the sealing faces in this case. Special sealing faces can obviously also be provided on the internal wall of the tube and on the nozzle needle for the sealing fit.

In principle, adjustment can also be carried out manually after some practice.

However, it is preferable to provide a control circuit consisting of a pressure sensor which is arranged in the solution or emulsion supply line and is connected via a pulse line to a controller with transducer which, in turn, is connected via a pulse line to an actuator allocated to the nozzle needle.

If the measured pressure value differs from the reference value stored in the controller, the controller instructs the actuator to adjust the nozzle needle accordingly in order to keep the preliminary pressure constant.

BRIEF DESCRIPTION OF THE DRAWING

An embodiment of the new apparatus is shown purely schematically in cross-section in the drawing in the FIGURE and is described in more detail below.

DETAILED DESCRIPTION OF THE INVENTION

Figure 1:
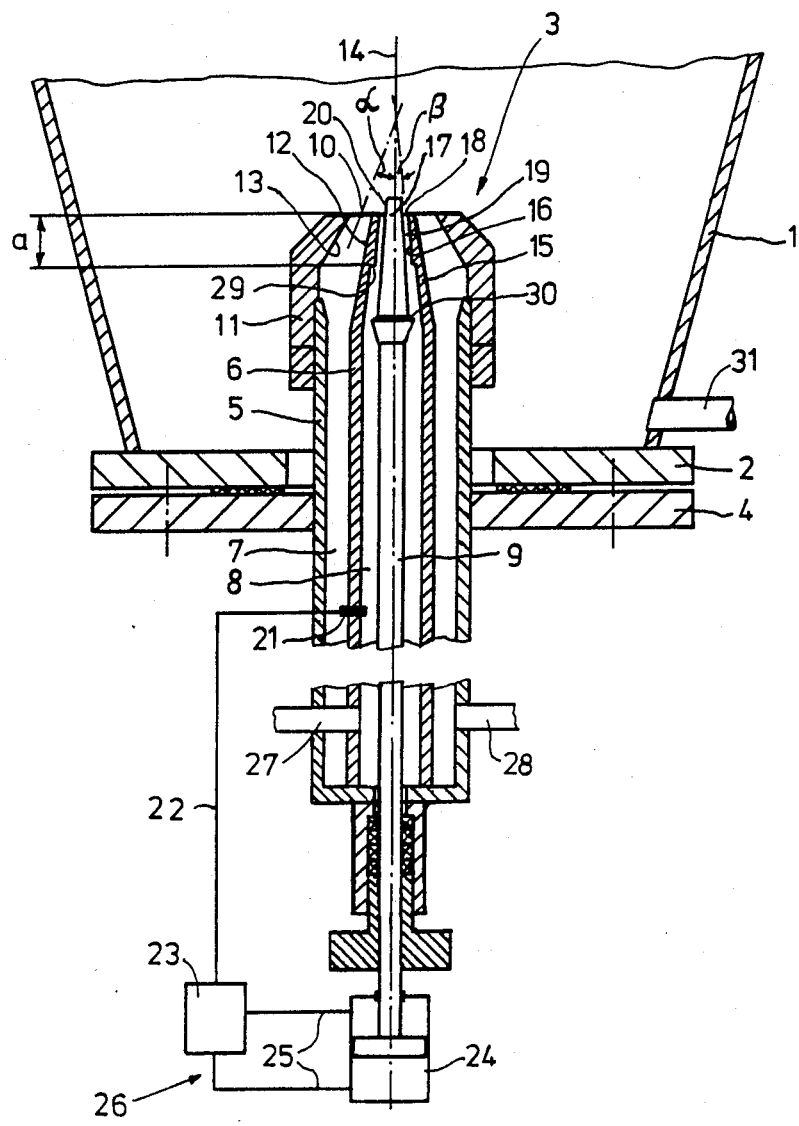

A two-component nozzle 3 projects from below through the base 2 of the indicated container 1 into the container 1 and is screwed in sealed fashion to the base 2 by means of a flange 4. The two-component nozzle consists of an outer casing 5 and an inner tube 6, an outer duct 7 lying between them as well as an inner duct 8 in which a nozzle needle 9 is arranged centrally and moveably. The orifice 10 of the outer duct 7 is formed by a cap 11, which is held on the casing 5, and the tube 6, both of which have conical surfaces 12, 13 at differing angles. An atomisation angle of 20° to the nozzle axis 14 is thus produced. The tube 6 runs into a truncated hollow cone 15 which is exchangeable. Its internal limiting surface 16 forms with the truncated cone tip 17 of the nozzle needle 9 the orifice 18 with a control section 19 of length a in the form of a conical annular gap, the thickness of which can be altered by adjusting the nozzle needle 9. The limiting surface 16 and the external surface 20 of the tip 17 each enclose an angle $\beta$ of 10° with the nozzle axis 14 so that the atomisation angle also corresponds to the angle $\beta$. A pressure measuring sensor 21 penetrates into the inner duct 8 and transmits the measured values via a pulse line 22 to a controller 23 with integrated transducer. Said transducer then actuates the actuator 24 via pulse lines 25 in order to keep the preliminary pressure in the duct 8 constant. This entire control circuit is designated by 26. Supply lines for the ducts 7 and 8 are designated by 27 and 28. The nozzle needle 9 has a separate sealing fit with the tube 6, which is formed by sealing faces 29 and 30. Water enters the container 1 through an inlet 31.

EXAMPLE OF METHOD

The apparatus shown in the drawing is used as follows.

The container 1 has a volume of 0.7 m$^3$. It is filled with 99° C. hot water. 20% by weight of chlorinated rubber emulsion heated to 85° C. is supplied in a quantity of 500 kg/h via the supply line 27 to the duct 8 of the two-component nozzle 3. It issues from the orifice 18 as a hollow jet having a wall thickness of 1.0 mm. The central atomisation angle $\beta$, with respect to the nozzle axis 14, is 10°. The steam is injected at 150° C. in a quantity of 300 kg/h through the orifice 10 at an angle $\alpha$ of 20°. The steam jet tears open the jet of solution, forming many small particles which rise in the water and can be removed from the surface. A preliminary pressure of 8 bar prevails in the inner duct 8 through which the solution is guided. The control circuit 26 operates in such a way that the cross-section of flow can be altered in the sense of an alteration in the discharge rate in order to keep the preliminary pressure constant during any variations in operation by adjustment of the nozzle needle 9 in the control section 12.

We claim:
1. A method for the continuous recovery of organic polymers from solutions or emulsions thereof, comprising injecting such a solution or emulsion in a jet with a nozzle having an axis and into a liquid in a vessel which is immiscible with the solution or emulsion, heating the solution or emulsion above the boiling point of the respective azeotrope and supplying vapour jet concentrically to the jet of solution or emulsion, the improvement wherein the solution or emulsion is injected in the form of a hollow jet at an angle $\beta$ enclosed between the jet of solution or emulsion and the nozzle axis and the vapour jet is injected at an angle $\alpha$ which is between 1° and 90° greater than the angle $\beta$ enclosed between the jet of solution or emulsion and the nozzle axis.

2. A method according to claim 1, wherein the jet of solution or emulsion is injected in a hollow jet with a wall thickness of from 0.1 to 5 mm.

3. A method according to claim 2, wherein the discharge rate of the hollow jet of solution or emulsion is controlled while keeping the preliminary pressure contact.

* * * * *